United States Patent [19]

Blum et al.

[11] Patent Number: 5,252,403
[45] Date of Patent: Oct. 12, 1993

[54] SOLUTIONS OF POLYCONDENSATES WHICH HAVE N-CONTAINING HETEROCYCLIC RING SYSTEMS AS STRUCTURAL UNITS, POSSESSING IMPROVED ADHESION TO INORGANIC SUBSTRATES

[75] Inventors: Rainer Blum, Ludwigshafen; Hans J. Heller, Hamburg; Hans-Joachim Haehnle, Ludwigshafen; Klaus Lienert, Hamburg, all of Fed. Rep. of Germany

[73] Assignee: BASF Lacke + Farben Aktiengesellschaft, Munster, Fed. Rep. of Germany

[21] Appl. No.: 838,945

[22] Filed: Feb. 21, 1992

[30] Foreign Application Priority Data

Mar. 9, 1991 [DE] Fed. Rep. of Germany ....... 4107664

[51] Int. Cl.⁵ .......................... B32B 9/04; B05D 3/02; C08L 79/04; C08G 77/26
[52] U.S. Cl. .................. 428/447; 427/385.5; 524/188; 524/262; 524/265; 524/879; 524/607; 525/431; 528/26; 528/30; 528/38; 428/493.5
[58] Field of Search ............... 524/188, 262, 265, 607, 524/879; 427/385.5; 428/473.5, 447; 525/431; 528/26, 30, 38

[56] References Cited

U.S. PATENT DOCUMENTS

| | | | |
|---|---|---|---|
| 3,705,911 | 12/1972 | Thomson | 260/349 |
| 3,813,351 | 5/1974 | Thompson | 524/188 |
| 4,292,234 | 9/1981 | Borel | 524/565 |
| 5,063,115 | 11/1991 | Herriman et al. | 524/188 |

FOREIGN PATENT DOCUMENTS

| | | |
|---|---|---|
| 0050768 | 5/1982 | European Pat. Off. |
| 1377214 | 12/1974 | United Kingdom |
| 1516193 | 6/1978 | United Kingdom |

Primary Examiner—Paul R. Michl
Assistant Examiner—Tae H. Yoon
Attorney, Agent, or Firm—Oblon, Spivak, McClelland, Maier & Neustadt

[57] ABSTRACT

Solutions of polycondensates which have N-containing heterocyclic ring systems as structural units, or solutions of intermediates of these polycondensates, in inorganic solvents, contain from 0.1 to 20% by weight, based on the polycondensates or the intermediates thereof, of one or more azidosilanes of the general formula $$N_3-R^3-Si-R^1{}_n(OR^2)_{3-n} \qquad I$$

where $R^1$ is $C_1-C_3$-alkyl, phenyl, benzyl or toluyl, $R^2$ is $C_1-C_4$-alkyl, $C_2-C_4$-alkoxyalkyl, phenyl or benzyl, $R^3$ is $C_1-C_8$-alkylene which may be interrupted by an oxygen atom, a sulfur atom or a $-(N-R^4)$-group, where $R^4$ is hydrogen, methyl, ethyl or phenyl, and n is 0, 1 or 2.

5 Claims, No Drawings

SOLUTIONS OF POLYCONDENSATES WHICH HAVE N-CONTAINING HETEROCYCLIC RING SYSTEMS AS STRUCTURAL UNITS, POSSESSING IMPROVED ADHESION TO INORGANIC SUBSTRATES

The present invention relates to solutions of polycondensates which have N-containing heterocyclic ring systems as structural units, or solutions of intermediates of these polycondensates, in organic solvents, containing from 0.1 to 20% by weight, based on the polycondensates or the intermediates thereof, of one or more azidosilanes of the general formula

where $R^1$ is $C_1$-$C_3$-alkyl, phenyl, benzyl or toluyl, $R^2$ is $C_1$-$C_4$-alkyl, $C_2$-$C_4$-alkoxyalkyl, phenyl or benzyl, $R^3$ is $C_1$-$C_8$-alkylene which may be interrupted by an oxygen atom, a sulfur atom or a —(N—$R^4$)—group, where $R^4$ is hydrogen, methyl, ethyl or phenyl, and n is 0, 1 or 2.

Polyimides are being increasingly used for coating metal wires, glass and quartz fibers and substrates of silicon, if necessary having modified surfaces of silicon dioxide or silicon nitride, since the requirements for the heat stability of such coatings, for example in electronics and microelectronics, are constantly increasing.

To ensure adequate adhesion of polyimide coatings, the inorganic substrates must be pretreated with adhesion promoters. The adhesion promoters usually used are aminoalkoxysilanes, which are applied in the form of their dilute alcoholic or alcoholic/aqueous solutions to the inorganic substrate.

The polyimide or the soluble intermediates thereof can be applied only in a further operation after removal of the solvent.

In addition to aminoalkoxysilanes, azidosilanes are also of interest as adhesion promoters.

U.S. Pat. No. 3,705,911 describes silylazidoformates, which are used for improving the adhesion of polymers to inorganic substrates.

GB-B-1 377 214 and GB-B-1 516 193 disclose similar azidoformates as adhesion promoters.

EP-B-50 768 relates to a process for the preparation of azidoformates of the general formula

where $R^1$ to $R^3$ have the abovementioned meanings and may be, for example, short-chain alkyl or alkylene.

It is an object of the present invention to improve the adhesion of the polyimides to inorganic substrates without the latter having to be pretreated with an adhesion promoter.

We have found that this object is achieved by the solutions defined above.

The novel solutions contain polycondensates which have N-containing heterocyclic ring systems as structural units, or intermediates of these polycondensates. Suitable polycondensates are, for example, polybenzimidazoles, polybenzothiazoles, polybenzoxazoles, polyoxazinediones, polyquinazolinediones and polyisoindoloquinazolinediones. Processes for the preparation of these polycondensates are described in, for example, DE-A-29 33 826 and DE-A-23 11 659.

The polyoxazinediones are polycondensates having repeating structural units

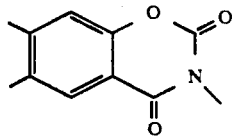

which are obtainable by reacting dihydroxydicarboxylic acids with diisocyanates.

The polyquinazolinediones contain repeating structural units

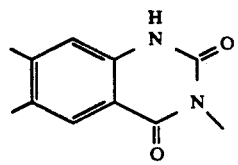

and are obtainable by reacting diaminodicarboxylic acids and diisocyanates.

The polyisoindoloquinazolinediones have repeating structural units

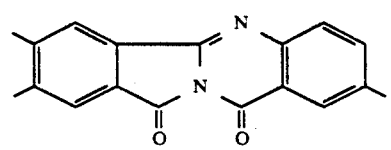

and are obtainable by reacting tetracarboxylic dianhydrides with o-aminoamides.

Repeating structural units in the polybenzoxazoles (-thiazoles) are

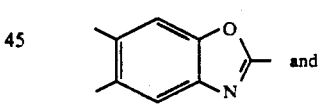 and 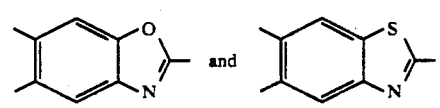

respectively. The polybenzoxazoles (-thiazoles) can be obtained, for example, by reacting dicarboxylic acids with di-o-aminophenols or -thiophenols, respectively.

The polybenzimidazoles have repeating structural units

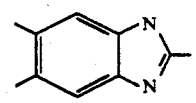

and are formed in the reaction of di-(o-diamines) with dicarboxylic acids.

Preferred polycondensates having N-containing heterocyclic ring systems are polyimides possessing repeating structural units

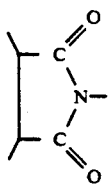

which are obtainable, for example, by reacting tetracarboxylic dianhydrides with diamines or diisocyanates.

Intermediates of the polyimides are also preferred. These intermediates are polyamic acids having repeating structural units

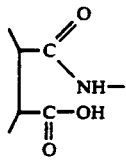

in which cyclization with the polyimide is not yet complete.

Preferably, one or more of the starting compounds from which the polycondensates or the intermediates thereof can be prepared contain aliphatic carbon atoms. These may be aliphatic compounds, for example aliphatic diamines or diisocyanates, or aromatic compounds which have aliphatic carbon atoms, for example as alkyl or alkoxy substituents, on aromatic ring systems or alkylene bridges between aromatic ring systems.

Particularly suitable tetracarboxylic dianhydrides from which polyimides or polyamic acids are obtainable are those having a total of 8 to 20 carbon atoms in the case of aliphatic tetracarboxylic dianhyrides and 10 to 20 carbon atoms in the case of aromatic ones. Dianhydrides of aromatic tetracarboxylic acids, in particular or pyromellitic acid, 3,3',4,4'-diphenyltetracarboxylic acid, 2,2',4,4'-diphenyltetracarboxylic acid, di-(dicarboxydiphenyl)-methane, di(dicarboxydihydroxyphenyl)-methane or benzophenonetetracarboxylic acid, are preferred.

Particularly suitable diamino compounds from which polyimides or polyamic acids are obtainable have a total of 2 to 20 carbon atoms in the case of aliphatic diamino compounds and 6 to 20 carbon atoms in the case of aromatic ones. Aromatic diamino compounds, in particular 4,4'-diaminodiphenyl oxide, 3,3,'-dimethylbenzidine, 3,3'-dimethoxybenzidine, 4,4'-diaminobenzophenone, 4,4'-diaminiobiphenyl and 4,4'-isopropylenedianiline, diaminotoluenes, 4,4'-diaminodiphenylmethane and 2,2-bis-4-(4-aminophenoxy)-phenylpropane, are preferred.

Suitable or preferred diisocyanates for the preparation of polyimides are preferably diisocyanates which correspond to the diamines and contain isocyanate groups instead of the amino groups. Diisocyanates which contain amino groups in addition to the isocyanate groups, e.g. 9,9-bis-(4-aminophenyl)-fluorene diisocyanate, are also suitable.

Where both the diamino or diisocyanato compound and the tetracarboxylic anhydride, as starting compounds for the polyimides or polyamic acids, are aromatic compounds, preferably one or more of the starting compounds contain aliphatic carbon atoms, in particular as $C_1$-$C_5$-alkyl, $C_1$-$C_5$-alkoxy or $C_1$-$C_5$-hydroxyalkyl substituents in an aromatic ring system or as a $C_1$-$C_4$-alkylene bridge between two aromatic ring systems.

The polycondensates or intermediates thereof may also contain ethylenically unsaturated groups, so that curing of the coatings may also be effected photochemically. For example, unsaturated alcohols, such as allyl alcohol, may be reacted with tetracarboxylic dianhydrides in order in this way to bond unsaturated groups to the polymer.

In this case, a content of from 0.01 to 2, preferably from 0.05 to 1.5, mol, based on 500 g of polycondensate or intermediates thereof, of ethylenically unsaturated groups has proven particularly suitable.

Another possible method for rendering polycondensates or intermediates thereof radiationcrosslinkable is the incorporation of benzophenone or derivatives thereof in the polymer skeleton. In the case of a desired photochemical crosslinking, the content of these carbonyl compounds is likewise from 0.01 to 2, preferably from 0.05 to 1.5, mol, based on 500 g of polycondensate or intermediates thereof.

The content of polycondensates having N-containing heterocyclic ring systems or intermediates thereof in the novel solutions is in general chosen so that the viscosity desired for processing is established. Concentrations of from 5 to 80, in particular from 10 to 60, % by weight have proven suitable in many cases.

Organic solvents of different polarity are suitable, depending on the molecular weight and solubility of the polycondensates or intermediates thereof.

Phenolic solvents, e.g. cresol, and amide solvents, such as dimethylformamide, dimethylacetamide or N-methylpyrrolidone, have proven suitable solvents, in particular for polyimides or polyamic acids.

The novel solutions furthermore contain from 0.1 to 20, preferably from 0.2 to 10, particularly preferably from 0.2 to 5, very particularly preferably from 0.2 to 3, % by weight, based on the polycondensates or the intermediates thereof, of one or more azidosilanes of the general formula $$N_3-R^3-Si-R^1{}_n(OR^2)_{3-n} \qquad (I)$$

where $R^1$ is $C_1$-$C_3$-alkyl, phenyl, benzyl or toluyl, $R^2$ is $C_1$-$C_4$-alkyl, $C_2$-$C_4$-alkoxyalkyl, phenyl or benzyl, $R^3$ is $C_1$-$C_8$-alkylene which may be interrupted by an oxygen atom, a sulfur atom or a —(N—$R^4$)—group, where $R^4$ is hydrogen, methyl, ethyl or phenyl, and n is 0, 1 or 2.

Aliphatic azidosilanes are preferred, in particular those in which R is $C_1$-$C_4$-alkyl, $R^3$ is $C_1$-$C_6$-alkylene and n is 0. 3-Azidopropyltriethoxysilane is very particularly preferred.

The novel solutions may additionally contain alkanolamines, which may further improve the adhesion to inorganic substrates. Alkanolamines of the general formula $$(HO-R^5-)_m NH_{3-m}$$

where $R^5$ is $C_1$-$C_6$-alkylene and m is 1, 2 or 3, are particularly suitable. Their content is preferably from 0.1 to 5, particularly preferably from 0.2 to 2, % by weight, based on the polycondensates or the intermediates thereof.

The solutions may furthermore contain, for example, conventional assistants, such as levelling agents, wetting agents, catalysts for curing, for example photoinitiators in the case of photochemical crosslinking, and stabilizers.

For the preparation of the solutions, the individual components can be dissolved in a suitable organic solvent or solvent mixture. It is possible first to prepare the polycondensates or the intermediates thereof in the organic solvent; for example, polyimides or polyamic acids are obtainable by reacting tetracarboxylic dianhydrides with diamino compounds in the presence or absence of tertiary amines or organotin compounds as catalysts in the abovementioned polar solvents. The azidosilanes and, if necessary, further assistants and additives can then be added to the solution.

The adhesive effect can also be improved if the novel solutions are heated before being further processed. A temperature of from 40° to 100° C., in particular from 50° to 70° C., for from 10 to 120, in particular from 30 to 60, minutes is suitable.

The novel solutions are suitable for firmly adhering coatings on inorganic substrates, for example on metals in the form of metal wires, glass and quartz fibers and silicon (wafers). The adhesion to substrates based on silicon is particularly advantageous. In particular, it is possible to achieve very good adhesion of the coating even on surface-modified silicon (silicon dioxide or silicon nitride surface obtained by treatment with oxygen or nitrogen, respectively).

The inorganic substrates need not be pretreated with adhesion promoters, as has been necessary to date, with the use of aminoalkoxysilanes.

After application, the solvent can be removed and, if required, the coating can be cured by increasing the temperature or by exposure to high energy light. After application, polyamic acids can be converted into polyimides by increasing the temperature.

EXAMPLE 1

Polyamic acid solution

Preparation of the polyamic acid solution

In a dry three-necked flask, 0.25 mol (102.75 g) of 2,2-bis-(4-(4-aminophenoxy)-phenylpropane were dissolved in 471.75 g of N-methylpyrrolidone at room temperature. This solution was heated to 50° C. under a gentle stream of dry nitrogen, after which a total of 0.25 mol (54.5 g) of pyromellitic anhydride was introduced in ten roughly equal portions at intervals of 10 minutes. Stirring was continued for one hour at 60° C. and the mixture was cooled to room temperature.

Preparation of coatings L1 to L5 and V1 to V4

3-Azidopropyltriethoxysilane (3AZPS) or 3-aminopropyltriethoxysilane (3AMPS) and diethanolamine (DEA) were added to the polyamic acid solution at room temperature (Table 1). The solution was kept for 1 hour at the temperature stated in Table 1, if necessary after the addition of the adhesion promoter but before DEA was added. Test Wafers of very pure silicon were oxidized on their surface to $SiO_2$ in an oxygen plasma. The coatings were applied to these wafers using a spin coater, the speed of the spin coater being chosen so that the coatings had a layer thickness of 10±2 μm. The test specimens were dried for 30 minutes at 90° C., and the polyamic acid was then converted into the imide by heating at 350° C. for one hour.

The test specimens were then stored for 48 hours at room temperature and humidity and then boiled in demineralised water for 4 hours. Immediately after removal, the test specimens were dried off and were scratched at 1 mm intervals with a sharp knife, and the adhesion was tested using self-adhesive tape. The evaluation was based on an internal scale, the ratings 2 to 4 being intermediate ratings between rating 1 (=perfect adhesion) and rating 5 (=residue-free delamination) (Table 1).

TABLE 1

| Coating | 3AZPS % by wt.* | 3AMPS % by wt.* | DEA % by wt.* | T/°C. | Adhesion to silicon wafers Rating |
|---|---|---|---|---|---|
| L1 | 0.5 | — | — | — | 3 |
| L2 | 1.0 | — | — | — | 2–3 |
| L3 | 0.5 | — | — | 70 | 2 |
| L4 | 1.0 | — | 0.2 | — | 1–2 |
| L5 | 0.5 | — | 0.2 | 70 | 1 |
| V1 (for comparison) | — | — | — | — | 5 |
| V2 (for comparison) | — | — | 0.5 | — | 5 |
| V3 (for comparison) | — | 0.5 | — | — | 5 |
| V4 (for comparison) | — | 1.0 | 0.2 | 70 | 5 |

*The stated weights relate to the polyamic acid

To test the shelf life, the coatings were stored at room temperature, and the time taken for the initial viscosity to double was determined as a measure of the stability of the viscosity. To test the permanent adhesion-improving effect, adhesion tests were carried out as described above on silicon wafers after 10 and 20 days.

TABLE 2

| | Adhesion to silicon wafers | | | |
|---|---|---|---|---|
| Coating | Immediately after preparation of the coating | 10 days later | 20 days later | Doubling of the initial viscosity of the coating after Weeks |
| L1 | 3 | 3 | 4 | 22 |
| L2 | 2–3 | 2–3 | 3–4 | 22 |
| L3 | 2 | 2 | 2–3 | 38 |
| L4 | 1–2 | 2 | 3 | 12 |
| L5 | 1 | 1 | 1–2 | 32 |
| V1 | 5 | 5 | 5 | 34 |
| V2 | 5 | 5 | 5 | 8 |
| V3 | 5 | 5 | 5 | 10 |
| V4 | 5 | 5 | 5 | 8 |

EXAMPLE 2

Polyimide solution

Preparation of the polyimide solution

In a dry three-necked flask, 0.25 mol (80.5 g) of benzophenonetetracarboxylic dianhydride was dissolved in 254 g of N-methylpyrrolidone (NMP) at room temperature. The mixture was heated to 700C under dry nitrogen, after which a solution of 0.25 mol (101 g) of 9,9-bis-(4-aminophenyl)-fluorene diisocyanate in 254 g of NMP was added dropwise in the course of 2 hours; gas evolution began. After the end of the feed, the solution was kept for one hour at 140° C. and then cooled.

A brown resin solution was obtained. The acid number was 7. A coat on potassium bromide showed the band typical of polyimide at 1770 cm$^{-1}$ in the IR spectrum. Preparation of coatings L6 to L11 and V5 to V7 and testing of the coatings.

The preparation of the coatings and the testing for adhesion were carried out as described above. Table 3 lists the proportions by weight of the adhesion promoter and the results of the adhesion test. After the addition of the adhesion promoter, the solution was, if necessary, kept for one hour at the temperature likewise stated in Table 3.

TABLE 3

| Coating | 3AZPS % by wt.* | 3AMPS % by wt.* | DEA % by wt.* | T/°C. | Adhesion to silicon wafers Rating |
| --- | --- | --- | --- | --- | --- |
| L6 | 0.5 | — | — | — | 3 |
| L7 | 0.5 | — | — | 70 | 2-3 |
| L8 | 1.0 | — | 0.2 | — | 1-2 |
| L9 | 1.0 | — | 0.2 | 70 | 1 |
| L10 | 0.5 | — | 0.2 | — | 3 |
| L11 | 0.5 | — | 0.2 | 70 | 1 |
| V5 | — | — | — | — | 5 |
| V6 | — | — | 0.5 | — | 5 |
| V7 | — | 1 | 0.5 | 70 | 5 |

*The stated weights relate to polyimide

The adhesion remaining after storage was likewise tested as above.

TABLE 4

| | Adhesion to silicon wafers | | |
| --- | --- | --- | --- |
| Coating | Immediately after preparation of the coating | 10 days later | 20 days later |
| L6 | 3 | 3 | 4 |
| L7 | 2 | 2 | 2-3 |
| L8 | 1-2 | 2 | 2-3 |
| L9 | 1 | 1 | 1 |
| L10 | 3 | 3 | 4 |
| L11 | 1 | 1 | 1 |
| V5 | 5 | 5 | 5 |
| V6 | 5 | 5 | 5 |
| V7 | 5 | 5 | 5 |

We claim:

1. A solution of polycondensate having heterocyclic repeating structural units comprising polybenzimidazoles, polybenzothiazoles, polybenzoxazoles, polyoxazinediones, polyquinazolinediones, polyisoindoloquinazolinediones, polyimides or intermediates thereof obtained by reacting tetracarboxylic dianhydrides with diamines or diisocyanates, or mixture thereof in an organic solvent, containing from 0.1 to 20% by weight, based on the polycondensate or the intermediate thereof, of one or more azidosilanes of the formula $$N_3-R^3-Si-R^1{}_n(OR^2)_{3-n} \qquad I$$

where $R^1$ is $C_1$-$C_3$-alkyl, phenyl, benzyl or toluyl, $R^2$ is $C_1$-$C_4$-alkyl, $C_2$-$C_4$-alkoxyalkyl, phenyl or benzyl, $R^3$ is $C_1$-$C_8$-alkylene which may be interrupted by an oxygen atom, a sulfur atom or a —(N—$R^4$)-group, where $R^4$ is hydrogen, methyl, ethyl or phenyl, and n is 0, 1, or 2.

2. A solution as claimed in claim 1, wherein the polycondensate is a polyimide or a polyamic acid as an intermediate thereof.

3. A solution as claimed in claim 1, containing an azidosilane of the formula I, where $R^2$ is $C_1$-$C_4$-alkyl, $R^3$ is $C_1$-$C_6$-alkylene and n is 0.

4. An inorganic substrate coated with the polycondensate which has N-containing heterocyclic ring systems as structural units, obtainable using a solution as claimed in claim 1.

5. A process for improving the adhesion of polycondensates having heterocyclic repeating structural units comprising polybenzimidazoles, polybenzothiazoles, polybenzoxazoles, polyoxazinediones, polyquinazolinediones, polyisoindoloquinazolinediones, polyimides or intermediates thereof obtained by reacting tetracarboxylic dianhydrides with diamines or diisocyanates, or mixture thereof in an organic solvent, to inorganic substrates, wherein an azidosilane of the formula $$N_3-R^3-Si-R^1{}_n(OR^2)_{3-n} \qquad I$$

where $R^1$ is $C_1$-$C_3$-alkyl, phenyl, benzyl or toluyl, $R^2$ is $C_1$-$C_4$-alkyl, $C_2$-$C_4$-alkoxyalkyl, phenyl or benzyl, $R^3$ is $C_1$-$C_8$-alkylene which may be interrupted by an oxygen atom, a sulfur atom or a —(N—$R^4$)-group, wherein $R^4$ is hydrogen, methyl, ethyl or phenyl, and n is 0, 1 or 2, is added to the solution of the polycondensate or the solution of an intermediate of the polycondensate in an organic solvent, and the resulting solution is applied to the inorganic substrate.

* * * * *